(12) United States Patent
Broeckel et al.

(10) Patent No.: US 8,290,675 B2
(45) Date of Patent: Oct. 16, 2012

(54) RECOVERY OF ENERGY IN A HYBRID VEHICLE HAVING A HYDRAULIC OR PNEUMATIC BRAKING SYSTEM

(75) Inventors: Friedhelm Broeckel, Asperg (DE); Andreas Tost, Neckarwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 746 days.

(21) Appl. No.: 11/990,728

(22) PCT Filed: Jul. 6, 2006

(86) PCT No.: PCT/EP2006/063932
§ 371 (c)(1),
(2), (4) Date: Jul. 29, 2009

(87) PCT Pub. No.: WO2007/020130
PCT Pub. Date: Feb. 22, 2007

(65) Prior Publication Data
US 2009/0299591 A1    Dec. 3, 2009

(30) Foreign Application Priority Data
Aug. 19, 2005    (DE) .......................... 10 2005 039 314

(51) Int. Cl.
*B60W 30/18* (2006.01)
*B60T 13/58* (2006.01)
*B60K 6/04* (2006.01)

(52) U.S. Cl. ............................. 701/70; 701/22; 303/152
(58) Field of Classification Search .................. None
See application file for complete search history.

(56) References Cited

U.S. PATENT DOCUMENTS

| | | | | |
|---|---|---|---|---|
| 3,731,168 A * | 5/1973 | Strifler | ........................... | 318/139 |
| 5,378,053 A * | 1/1995 | Patient et al. | ...................... | 303/3 |
| 5,853,229 A * | 12/1998 | Willmann et al. | ................ | 303/3 |
| 5,895,100 A * | 4/1999 | Ito et al. | ........................ | 303/152 |
| 7,311,163 B2 * | 12/2007 | Oliver | ........................... | 180/165 |
| 2005/0143878 A1 * | 6/2005 | Park et al. | ......................... | 701/22 |
| 2007/0296264 A1 * | 12/2007 | Haupt et al. | ...................... | 303/3 |

FOREIGN PATENT DOCUMENTS

| | | |
|---|---|---|
| DE | 196 04 134 | 8/1997 |
| DE | 198 10 656 | 9/1999 |
| DE | 199 09 809 | 9/1999 |
| EP | 1081005 A2 * | 3/2001 |
| JP | 9-22409 | 1/1997 |
| JP | 9310728 | 12/1997 |
| WO | WO 2004/101308 | 11/2004 |

* cited by examiner

*Primary Examiner* — Michael J. Zanelli
(74) *Attorney, Agent, or Firm* — Kenyon & Kenyon LLP

(57) ABSTRACT

In a method for recovering energy in a braking process of a hybrid vehicle which has an internal combustion engine and an electric drive, as well as a hydraulic or pneumatic braking system, the exploitation of the electric drive is able to be optimized if the braking system includes at least one pressure reduction valve, using which the braking pressure exerted by the driver is able to be reduced as a function of the deceleration proportion of the electric machine.

7 Claims, 5 Drawing Sheets

RECOVERY OF ENERGY IN A HYBRID VEHICLE HAVING A HYDRAULIC OR PNEUMATIC BRAKING SYSTEM

BACKGROUND OF THE INVENTION

1. Field of the Invention

The present invention relates to a method and a device for recovering energy in a braking process of a hybrid vehicle.

2. Description of Related Art

In hybrid vehicles the kinetic energy being liberated in response to a deceleration process is usually converted into electrical energy, and stored in the vehicle electrical system. Known recovery systems use the electric drive as generator for this purpose. The generator generates a drag torque in the process, which contributes to the deceleration of the vehicle. The electrical energy thus acquired may be utilized in other driving situations, either for driving the vehicle or for supplying electrical users. The efficiency of the vehicle is able to be considerably improved thereby.

Known recovery systems are designed in such a way that the greatest proportion of the vehicle deceleration is effected by the service brake, and only a small proportion (depending on the vehicle electrical system state) by the generator. This has the substantial disadvantage that the maximum electrical power that is able to be generated by the generator is usually not able to be utilized fully.

It is therefore an object of the present invention to optimize the electrical power generated by the generator and thus further to increase the overall efficiency of the vehicle.

A BRIEF SUMMARY OF THE INVENTION

In accordance with the present invention, it is provided to record the driver's braking command (the desired overall deceleration), to ascertain the vehicle deceleration that is able to be effected by the electric machine, preferably taking into account the energetic vehicle electrical system state, and to reduce appropriately the braking pressure exerted by the driver as a function of the proportion of the deceleration of the electrical machine, so that the deceleration desired by the driver is carried out. To do this, the driver's braking pressure is reduced correspondingly, using a suitable actuator (pressure reduction unit), or, if necessary, is completely removed. This has the essential advantage that the electric machine is able to be operated in a range of maximum generation of electric energy during a braking process, and consequently a maximum proportion of the kinetic energy of the vehicle may be recovered.

By the designation "vehicle deceleration" one should understand, in this instance, both a deceleration [m/s2] and proportional quantities, such as the electric power generated by the generator, a drag torque of the generator, etc.

The vehicle deceleration that is able to be generated by the electric machine is dependent, among other things, on how much electric power the vehicle electrical system is still able to absorb. This information may be obtained, for instance, from an energy management system, and be taken into account in the determination of the deceleration proportion of the electric machine.

Preferably one valve for reducing the driver's braking pressure is situated in at least one brake line. This valve is preferably activated by a control unit. According to one preferred specific embodiment, the valve according to the present invention is activated in a clocked manner. A particularly simple and cost-effective adjustment of the braking pressure may be effected thereby. The valve may optionally also be activated in a linear manner, of course.

If a plurality of such valves is installed, they are preferably not included in all the brake lines. The valve(s) is/are preferably situated only in the brake lines of the driven wheels.

The braking pressure taking effect at the wheel is preferably regulated to a setpoint value using a controller, the valve forming the actuator of the regulation. In this case, the brake control unit includes a suitable regulating algorithm.

In the case of a vehicle having slip control, such as ABS or ESP, in which the brake fluid is supplied to the wheel brakes via so-called inlet valves, these inlet valves may be utilized as pressure reduction valves in the recovery operation. In this case, an additional valve is not required.

A braking system, according to the present invention, for the recovery of energy, includes at least one electronics system, according to the present invention, such as a control unit which records the magnitude of the driver's deceleration command and ascertains a vehicle deceleration that is able to be generated by the electric machine, as well as a pressure reduction unit which is controlled as a function of the overall deceleration command and of the deceleration proportion of the electric machine, by the electronics system.

The magnitude of the driver's braking command may be obtained, for instance, by a braking value sensor or a braking pressure sensor (e.g. the so-called admission pressure sensor).

A BRIEF DESCRIPTION OF THE SEVERAL VIEWS OF THE DRAWING

DETAILED DESCRIPTION OF THE INVENTION

Figure 1:
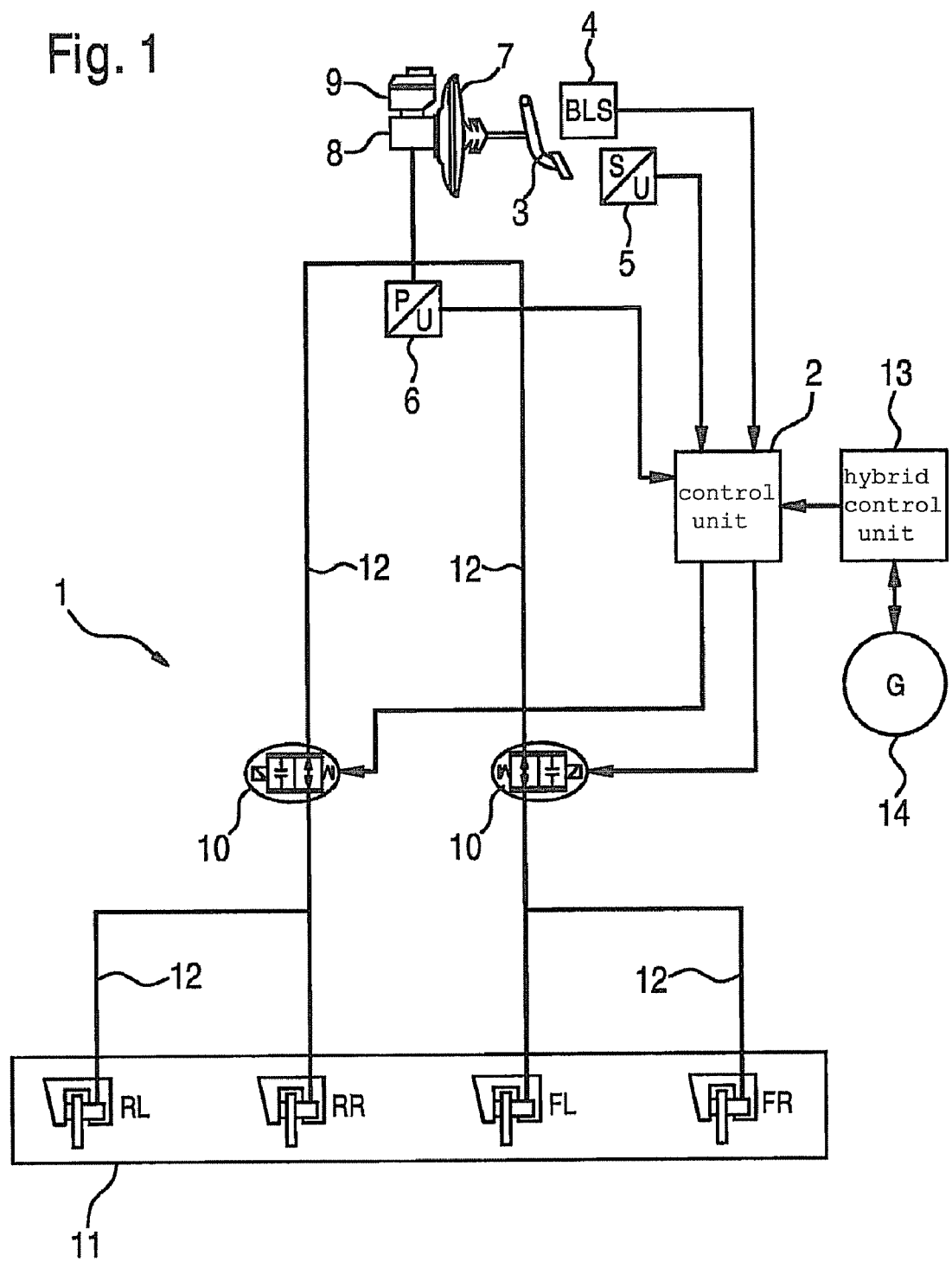
FIG. 1 shows a schematic representation of a motor vehicle braking system in II-circuit subdivision having a pressure reduction valve according to the present invention.

FIG. 1 shows a hydraulic motor vehicle braking system in II-circuit subdivision whose constructive design is essentially known from the related art. In a known way, braking system 1 includes a foot brake pedal 3, a brake booster 7 having a main brake cylinder 8 on which a brake-fluid reservoir 9 is situated. Brake booster 7 boosts the braking force exerted by the driver on foot brake pedal 3, and generates a braking pressure which is guided to wheel brakes 11 via brake lines 12.

By contrast to the known braking systems, this braking system of the present invention includes an additional valve 10 which is situated in the main brake line 12 of the driven axle and is used to reduce the braking pressure exerted by the driver. (In this illustration, two valves 10 are shown, in the case of a rear-wheel drive, only left valve 10 being installed, in the case of a front-wheel drive, only right valve 10 being installed and in the case of an all-wheel drive, both valves 10 being installed). Valve(s) 10 is/are connected to a control unit 2, and is/are controlled by it as a function of the driver's deceleration command and the deceleration proportion of electric machine 14.

In recovery operation, electric machine 14 is operated as a generator. The generator generates a drag torque in the process, which contributes to the deceleration of the vehicle. Basically, an attempt is made to generate as high as possible a proportion of the overall deceleration by generator 14, in order to recover a maximum of the energy. The proportion above it, if present, is then effected by service brakes 11.

The generator operation is limited by the absorption capability of the vehicle electrical system. If the vehicle electrical system is able to absorb only a little electrical energy or no more at all, the deceleration proportion of electric machine 14 has to be correspondingly reduced, and the proportion of the service brakes increased.

The deceleration desired by the driver may be measured, for example, via a braking value sensor, such as a displacement sensor 5 or using a pressure sensor 6 (e.g. the so-called admission pressure sensor) situated in a brake circuit. The information on the electric power being able to be generated by generator 14 is received by control unit 2, for example, by a hybrid control unit 13, which determines the energetic state, or rather the absorption capability of the vehicle electrical system. Control units 2 and 13 may also be combined in a single control unit.

The deceleration proportion of service brakes 11 ($verz_B$) comes about from the overall deceleration command $verz_F$ and the proportion $verz_H$ of generator 14. The following applies:

$$verz_B = verz_F - verz_H$$

To set this value, pressure reduction valve(s) 10 is/are controlled (or regulated) by control unit 2 in such a way that specified braking pressure ($p_{vor}$) is correspondingly reduced.

The control of valves 10 preferably takes place in a clocked manner. Because of that, a very simple and cost-effective pressure reduction may be implemented.

Figure 2:
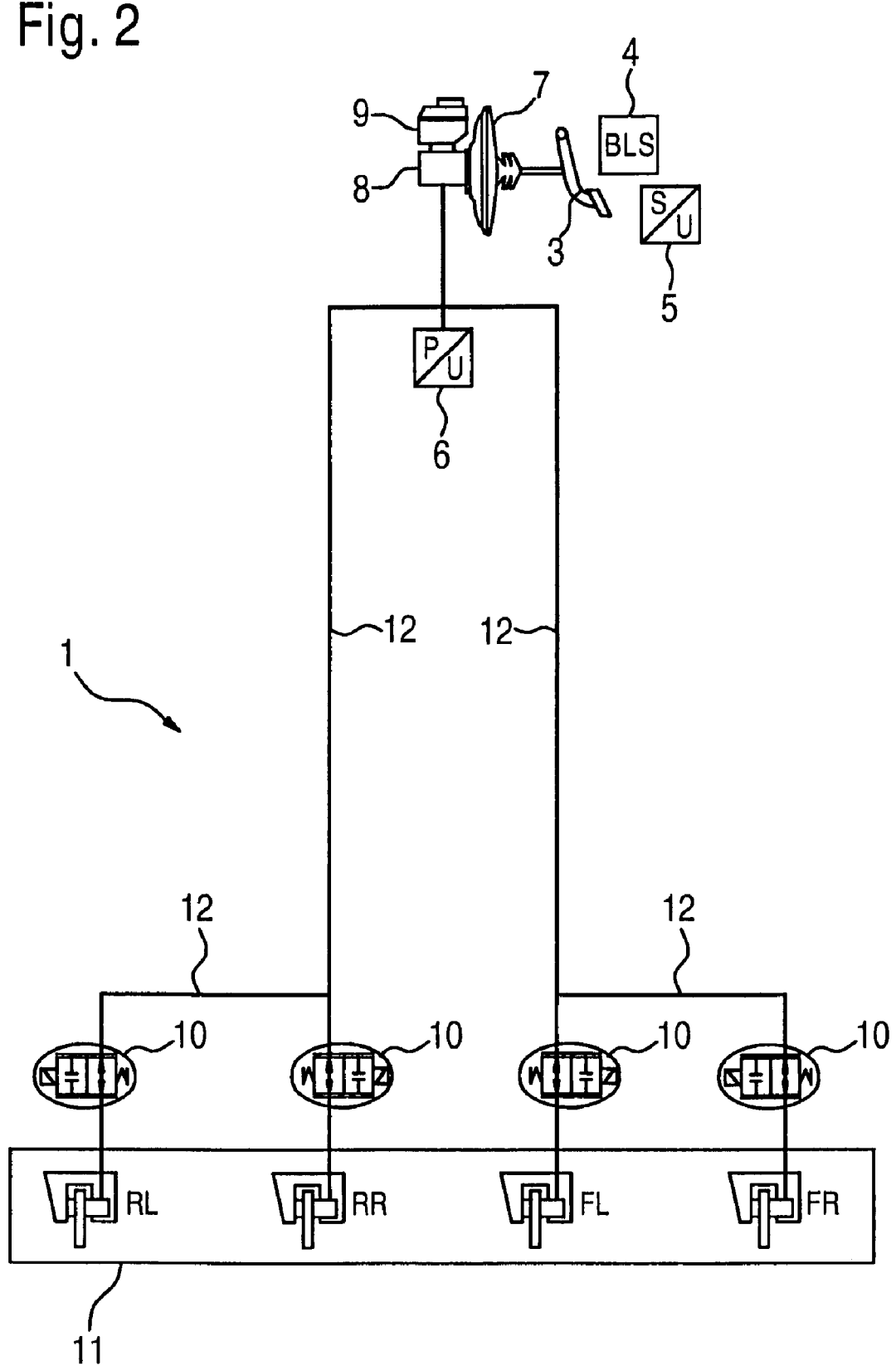
FIG. 2 shows a schematic representation of a motor vehicle braking system in X-circuit subdivision having a plurality of pressure reduction valves according to the present invention.

FIG. 2 shows a hydraulic brake system in X-circuit subdivision having a plurality of additional pressure reduction valves 10. The same elements in this case are designated by the same reference numerals as in FIG. 1. The outer electrical wiring is essentially identical to that in FIG. 1, but was omitted for reasons of clarity.

By contrast to FIG. 1, a separate valve 10 is provided in this case in each brake line 12 of the driven wheels. In a vehicle having front wheel drive, the valves are preferably located exclusively in brake lines 12 of the front wheels (the two right valves in the figure), in a vehicle having rear wheel drive in brake lines 12 of the rear wheels (the two left wheels) and in a vehicle having all-wheel drive in brake lines 12 of all the wheels (as shown).

In a braking process in which an additional deceleration is required by service brakes 11, valves 10 are controlled as was described with respect to FIG. 1. The braking pressure acting on brakes 11 is preferably regulated to a setpoint value.

Figure 3:
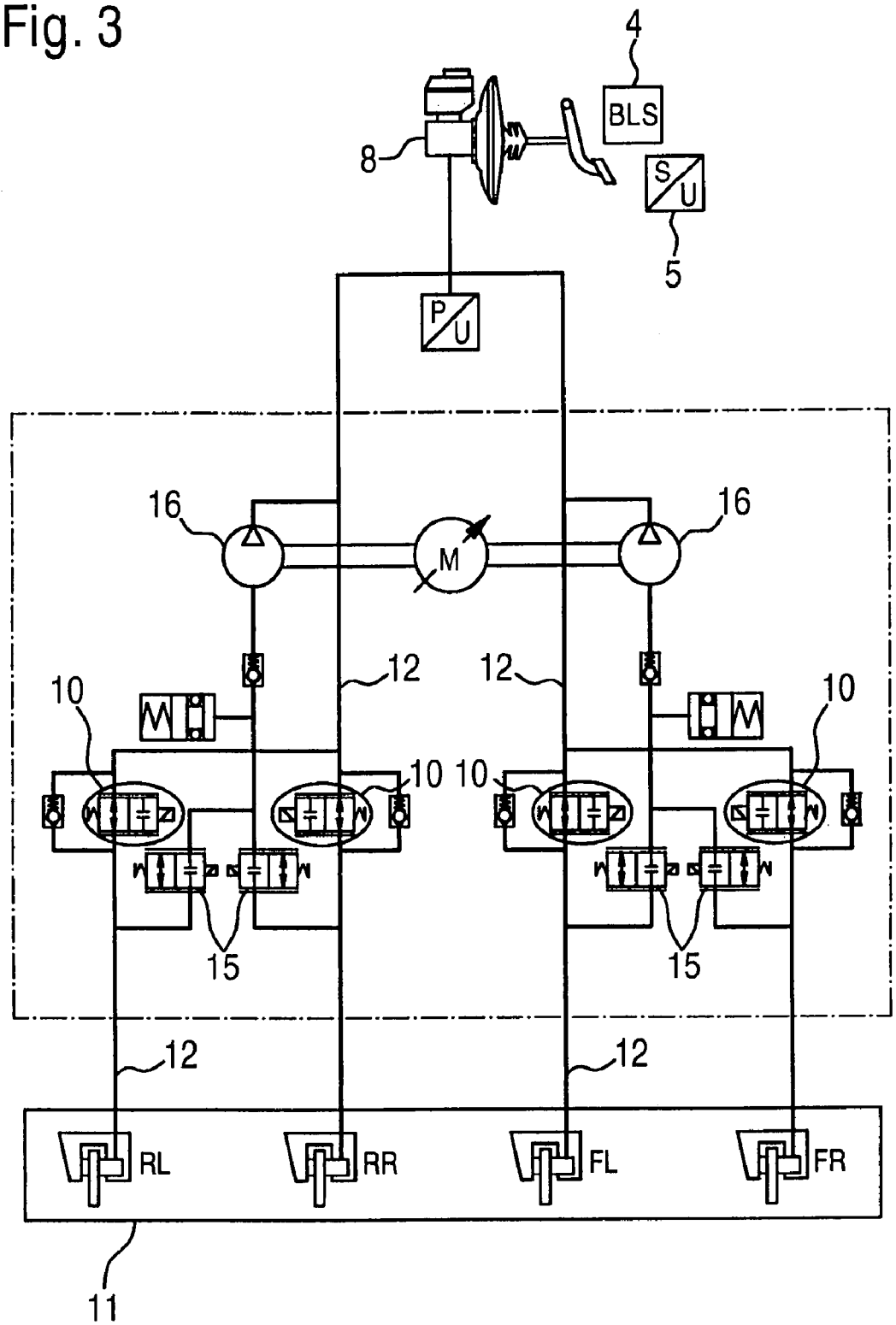
FIG. 3 shows a schematic representation of a motor vehicle braking system in II-circuit subdivision, which is laid out for a driving dynamics regulation and includes a plurality of pressure reduction valves according to the present invention.

FIG. 3 shows a motor vehicle braking system in II-braking subdivision, which is laid out for a braking force regulation within the scope of an ABS or ESP system. The outer electrical wiring is omitted in this case. The braking system shown, that is known from the related art includes its own inlet valve 10 for each wheel brake 11, by which the inflow of brake fluid to the wheel brakes is controlled.

In a regulating process of the driving dynamics regulation, the braking pressure is reduced by opening outlet valves 15, and is alternatingly newly built up again by the control of a hydraulic pump 16. In a braking process that lies below the regulating threshold of the driving dynamics regulating system, these inlet valves 10 may be used as pressure reduction valves, in the sense of the present invention. Valves 10 are closed more or less, depending on requirements, in this instance, in order to reduce appropriately the braking pressure acting on brakes 11. Additional pressure reduction valves are not required in this case.

In a vehicle having rear-wheel drive, preferably only the two left inlet valves 10 are utilized in recovery operation, in a vehicle having front-wheel drive the two right inlet valves 10 are utilized and in a vehicle having all-wheel drive all four inlet valves 10 are utilized.

Figure 4:
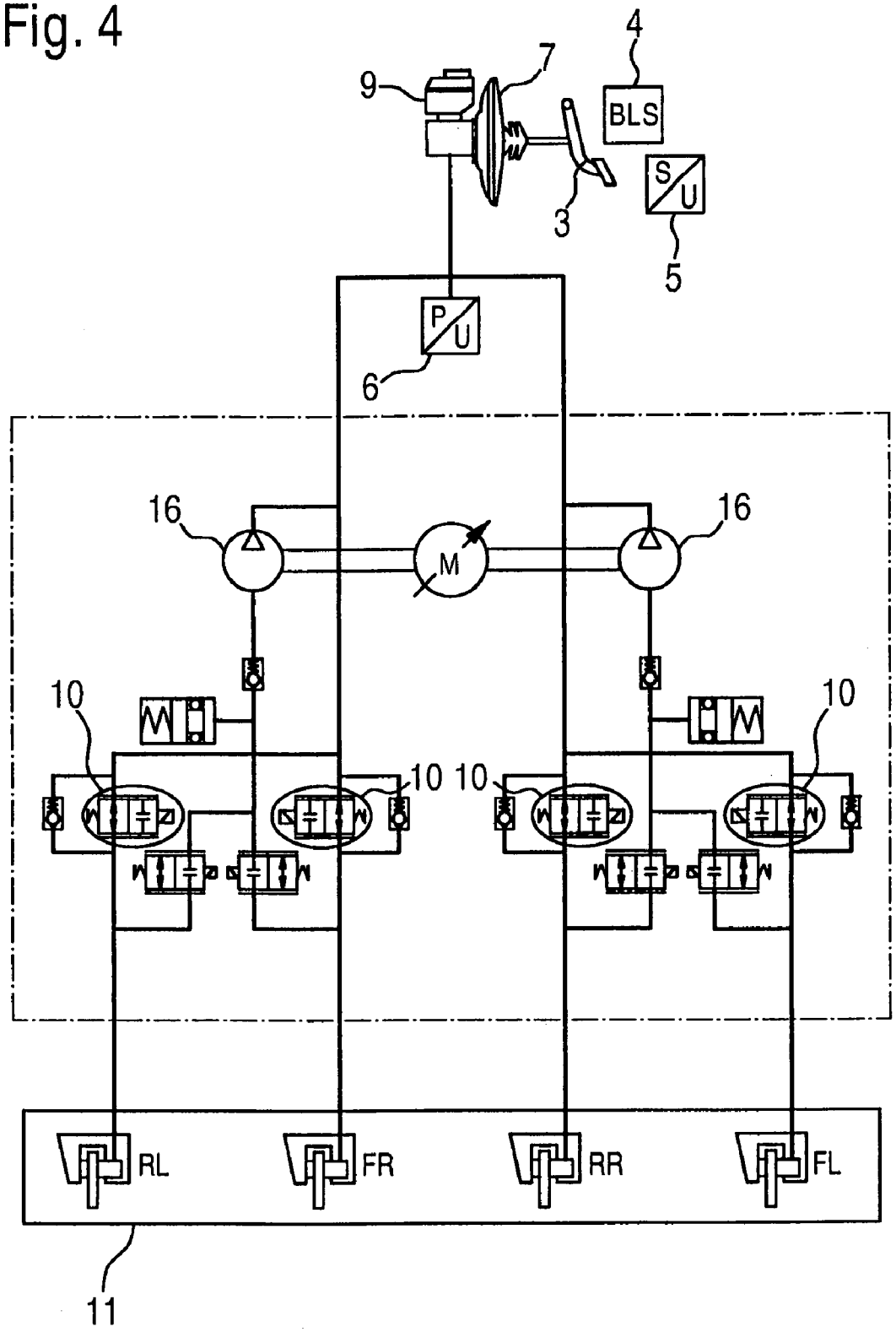
FIG. 4 shows a schematic representation of a motor vehicle braking system in X-circuit subdivision, which is laid out for a driving dynamics regulation and has a plurality of pressure reduction valves.

FIG. 4 shows a motor vehicle braking system in X-circuit subdivision which is also laid out for a driving dynamics regulation. Based on the different circuit subdivision, in this case, in a vehicle having rear-wheel drive, first and third valve 10 (from the left) are utilized for pressure reduction, and in a vehicle having front-wheel drive, second and fourth valve 10 (from the left) are utilized for pressure reduction.

Figure 5:
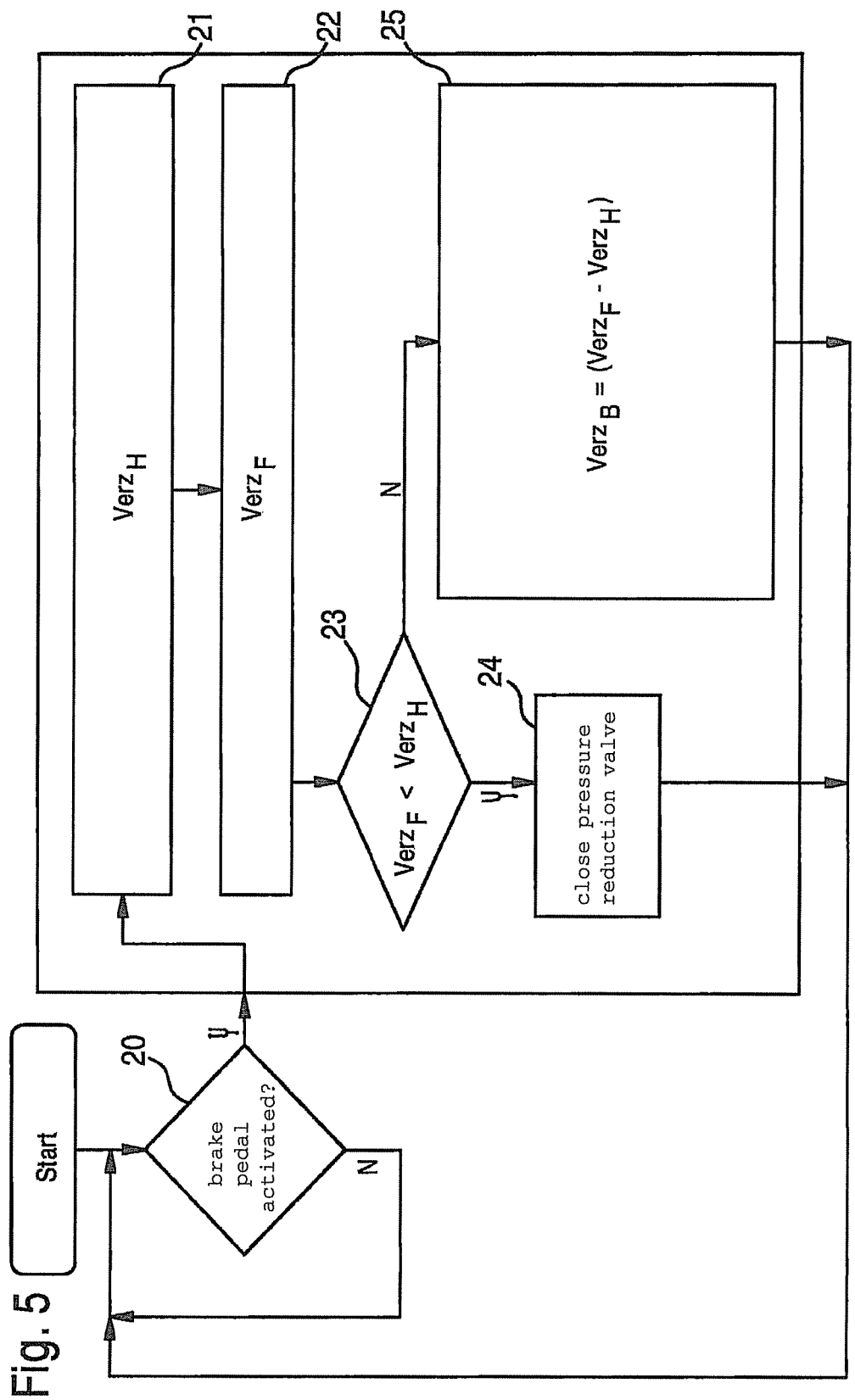
FIG. 5 shows a flow chart to represent a method for recovering energy according to one specific embodiment of the present invention.

FIG. 5 shows a flow chart in which the essential method steps in a recovery operation are shown. In step 20 it is first checked, in this context, whether the driver is operating foot brake pedal 3. This may be done, for instance, by monitoring brake light switch 4. In case there is a brake operation, in step 21, the deceleration that electric machine 14 is able to master or a quantity proportional to it, such as a drag torque, is ascertained. This information may be generated, for example, by a hybrid control unit 13, which monitors the generator state and the vehicle electrical system state.

In step 22, the deceleration desired by the driver, $verz_F$, or a value proportional to it, such as a braking torque, is calculated. The driver's command may be determined, for instance, using a pedal value sensor 5 or a pressure sensor 6, with the aid of a braking characteristics curve. In step 23 it is checked whether deceleration $verz_F$ is smaller than deceleration $verz_H$ that is able to be generated by electric machine 14. To the extent that deceleration $verz_H$ of the electric machine is sufficient for the braking process ($verz_H > verz_F$), pressure reduction valve(s) 10 is/are closed completely in step 24, and wheel brakes 11 of the driven wheels are decoupled from the braking pressure. The required braking action is effected in this case by electric machine 14 and also by those wheel brakes 11 of the other wheels which have not been decoupled from the braking pressure.

However, if deceleration $verz_F$ desired by the driver is greater than deceleration $verz_H$ of the electrical machine, a residual deceleration $verz_B$ is ascertained in step 25, which also has to be effected by wheel brakes 11 of the driven axle. In this context, the following equation applies: $verz_B = verz_F - verz_H$. An appropriate pressure regulation is able to be carried out in response to a known effective braking coefficient cp and a known throttling factor of pressure reduction valves 10. The actual braking pressure prevailing at the wheel brakes is preferably measured using pressure sensors, in this instance, and fed back into the regulation.

What is claimed is:

1. A method for recovering energy in a braking process of a hybrid vehicle having an internal combustion engine, an electric drive, and one of a hydraulic braking system or a pneumatic braking system, the method comprising:

detecting a driver's braking command representing an overall deceleration desired by the driver;

ascertaining a deceleration value which is able to be effected by the electric drive; and reducing a braking pressure exerted at at least one wheel brake by an amount depending on the overall deceleration desired by the driver and the deceleration value which is able to be effected by the electric drive;

wherein the braking pressure exerted at at least one wheel brake is reduced using a valve situated in a brake line and the valve is activated in a clocked manner.

2. The method as recited in claim 1, wherein the valve is an inlet valve of the one of the hydraulic braking system or the pneumatic braking system.

3. The method as recited in claim 1, wherein the valve is an inlet valve of the one of the hydraulic braking system or the pneumatic braking system, and wherein the valve is only situated in the brake line of a driven wheel.

4. A device for recovering energy in a braking process of a hybrid vehicle having an internal combustion engine, an electric drive, and one of a hydraulic braking system or a pneumatic braking system, comprising:

a sensor system configured to detect a driver's braking command representing an overall deceleration desired by the driver;

an electronics system configured to determine a deceleration value which is able to be effected by the electric drive; and a pressure reduction unit configured to selectively reduce a braking pressure exerted at at least one wheel brake by an amount depending on the overall deceleration desired by the driver and the deceleration value which is able to be effected by the electric drive;

wherein the pressure reduction unit includes a valve situated in a brake line and the valve is activated in a clocked manner.

5. The device as recited in claim 4, wherein the valve is only situated in the brake line of a driven wheel.

6. The device as recited in claim 4, wherein the valve is an inlet valve of the one of the hydraulic braking system or the pneumatic braking system.

7. The device as recited in claim 4, wherein the valve is an inlet valve of the one of the hydraulic braking system or the pneumatic braking system, and wherein the valve is only situated in the brake line of a driven wheel.

* * * * *